United States Patent [19]

Kramer et al.

[11] 4,284,187
[45] Aug. 18, 1981

[54] AUTOMATIC PACKING LINE

[75] Inventors: Ulrich Kramer, Pully; Alexis Chenevard, Morges, both of Switzerland

[73] Assignee: SAPAL, Societe Anonyme des Plieuses Automatiques, Ecublens, Switzerland

[21] Appl. No.: 41,303

[22] Filed: May 22, 1979

[30] Foreign Application Priority Data

Jun. 5, 1978 [CH] Switzerland .......................... 6153/78

[51] Int. Cl.³ ............................................. B65G 47/68
[52] U.S. Cl. .................................... 198/435; 198/447; 198/580; 198/592; 198/954; 53/493
[58] Field of Search ............... 198/347, 435, 447, 580, 198/592, 954, 572; 53/493

[56] References Cited

U.S. PATENT DOCUMENTS

| | | | |
|---|---|---|---|
| 1,921,577 | 8/1933 | Nelson | 198/580 |
| 2,536,756 | 1/1951 | Lopez | 198/347 |
| 2,675,118 | 4/1954 | Morrison | 198/592 |
| 3,080,043 | 3/1963 | Johansen et al. | 198/435 |
| 3,187,878 | 6/1965 | Harrison et al. | 198/572 |
| 3,938,654 | 2/1976 | Mohr | 198/954 |

Primary Examiner—Joseph E. Valenza
Attorney, Agent, or Firm—Cushman, Darby & Cushman

[57] ABSTRACT

An automatic packing line consisting of feeder conveyor belts arranged to bring products to be packed to a series of packing machines and of automatic feeder stations located along the said belts to distribute the said products selectively to the packing machines, is equipped with a recovery device installed after the last automatic feeder station to collect the products which have not been taken charge of by the said stations, a storage device for storing temporarily the products collected by the recovery device and an ejection device which evacuates the undistributed products when the storage device becomes saturated with such products.

7 Claims, 21 Drawing Figures

AUTOMATIC PACKING LINE

FIELD OF THE INVENTION

The present invention is concerned with an automatic packing line, and particularly a line intended for packing food products such as molded chocolate tablets or slabs of candy coated with chocolate.

BACKGROUND OF THE INVENTION

In the familiar automatic packing lines, and especially those intended for food products such as molded chocolate tablets or slabs of candy coated with chocolate, the said products, when they come from a production machine, customarily a molder or an enrober, are intended to feed a series of packing machines. Those products are transported by endless conveyor belts from the production machine to the packing machines. Picking up, one after another, some of the products transported by the endless belts is accomplished by automatic feeder stations, each one of which directs the products it picks up toward the packer with which it is associated. The machine's production capacity is generally equal to or slightly less than the sum of the capacities of the packing machines of the same line. Therefore, when an automatic feeder station or the packing machine associated with it gets out of order, some of the manufactured products cannot be taken charge of by the remaining packers, and consequently they must be evacuated at the end of the line. When they are molded products, they can be recovered in baskets and recycled to be molded again. On the other hand, when they are coated products, it can easily be imagined that it will scarcely be possible to mold them again, so that the surplus products will then constitute an irrecoverable loss, or possibly a raw material for making secondary products.

In order to mitigate these disadvantages, lines such as those defined above have been developed which consist of a means of storing rows of chocolate slabs temporarily, disposed on trays which then are stacked one on top of the other, for reintroduction into the line manually when all the elements going to make up that line have resumed their normal operating rhythm. Such a storage device is described in Swiss Patent No. 426,638, for example.

This device, although it makes it possible to reduce the amount of waste in the manufacturing of coated products, nevertheless has some major disadvantages. The fact is that storage requires trays which then are stacked one on top of the other. Because of the weight of the trays and the products, such stacking may cause crushing of, or at least partial damage to, the stored products. On the other hand, recycling the stored products makes manual handling necessary.

SUMMARY OF THE INVENTION

The present invention proposes to eliminate most of the deficiencies of the familiar techniques. For this purpose, it is characterized in that it also includes a device for the automatic recycling of the products stored by the storage device, with that device being designed to return the products collected by the recovery device and then stored by the storage device to the feeder conveyor belts above any automatic feeder station in the line.

The packing line includes a feeder conveyor belt designed to bring products to be packed to a series of packing machines and respective automatic feeder stations located along the feeder conveyor belt in order to distribute the products selectively to the packing machines. That line is equipped with a recovery device which collects the products which have not been taken charge of by the automatic feeder stations, a storage device to store the collected products temporarily, a recycling device and a discharging device which work together to return the products temporarily stored to the feeder conveyor belt and an ejection device which rejects the surplus products when the storage device is saturated.

This line offers the advantage of being entirely automatic, without requiring any manual operations.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

Figure 1:
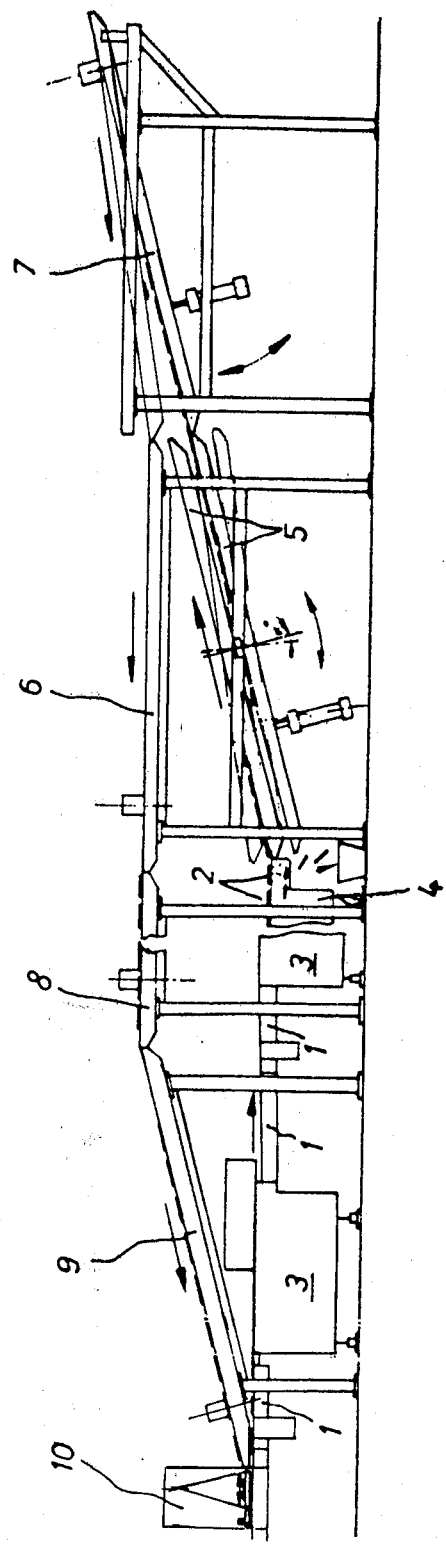
FIG. 1 presents, schematically, a front elevation view of an automatic packing line in conformity with the invention.

In reference to FIG. 1, the automatic packing line described here is made up of endless conveyor belts 1, represented schematically, which carry tablets of chocolate 2, for example, coming from a production machine (not shown) which may be, e.g. a molder or a coater of products with soft centers. These belts are interrupted by automatic feeder stations 3 which pick up, one after another, the products transported by the belts 1 in order to bring them directly to a packing machine (not shown). After the last automatic feeder station, an ejection device 4 (shown in greater detail in FIG. 4) is provided which, in the conventional lines, collects all the products which have not been taken charge of by the automatic feeder stations, and, subsequently, by the corresponding packing machines, but which, in the line being described, only intervenes in case the storage device is saturated, as will be described below.

After the ejection device 4, in the direction of movement of the products on the conveyor belts 1 (from left to right in FIG. 1), a recovery device 5 is located which will be described in greater detail in connection with FIG. 2, on top of which is a part 6 of the storage device, which itself is described in greater detail in connection with FIGS. 2 and 3. Another part 7 of the said storage device is located immediately after the recovery device 5 and constitutes the part of the line which is farthest downstream. Furthermore, as will be described below, the part 7 of the storage device makes it possible to reverse the direction of movement of the products in order to return them to the automatic packing line above any automatic feeder station. The storage device can include a more or less large number of conveyor belts 8 located above the feeder conveyor belts 1 for the purpose of increasing the storage capacity. Finally, the recycling device 9 and its discharge device 10 make it possible to return temporarily-stored products to the feeder conveyor belts 1. These two devices will be described in greater detail in connection with FIGS. 5 and 6.

Figure 2:
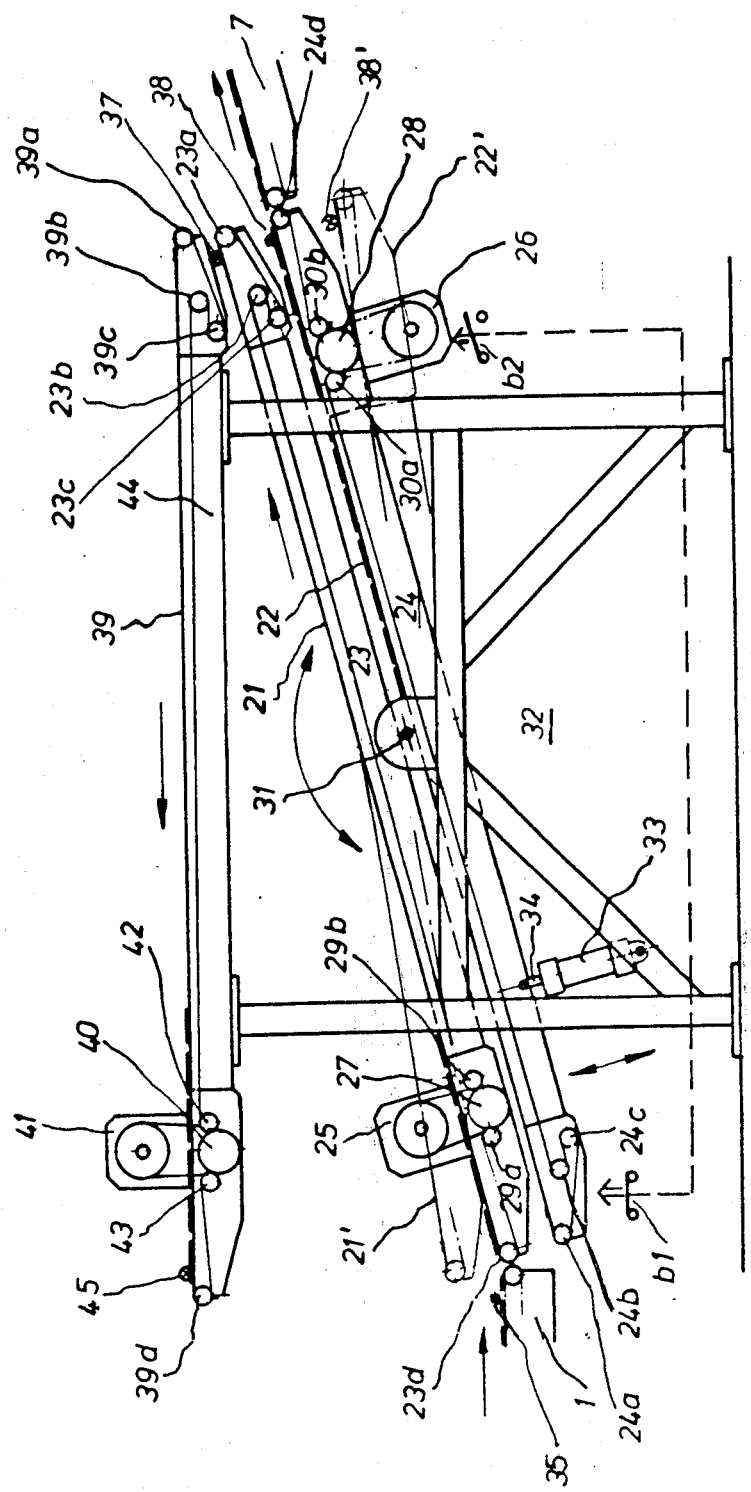
FIG. 2 is a detailed view of the recovery device of the line of FIG. 1.

In reference to FIG. 2, the recovery device consists, essentially, of two endless conveyor belts 21 and 22, parallel to each other and one above the other. The belts are installed on supports 23 and 24, respectively, and kept on those supports by tension wheels or cylinders 23a, 23b, 23c, 23d, 24a, 24b, 24c and 24d. Each of the belts 21 and 22 also has its independent driving mechanism consisting of a driver motor 25 or 26, respectively, a driving wheel 27 or 28, respectively, and two tension wheels 29a, 29b, or 30a, 30b, respectively, with all of these elements being installed, respectively, on the supports 23 and 24. The two supports 23 and 24 constitute a single piece and are designed to be able to pivot around an axis 31 borne horizontally by a casing 32. A jack 33 is fastened to one of the branches of the casing 32. The end of its piston rod 34 is connected with the support 24. The hydraulic or pneumatic jack 33 controls the positioning of the supports 23 and 24, and consequently it defines the position of the conveyor belts 21 and 22, as will be described subsequently. In FIG. 2, the conveyor belt 21 is located in the prolongation of a feeder conveyor belt defined by the reference number 1 in the description regarding FIG. 1. The conveyor belt 22 is prolonged by the part of the storage device bearing the reference number 7 in the description regarding FIG. 1.

As was said above, the two supports 23 and 24, bearing the conveyor belts 21 and 22, respectively, are pivotable around the horizontal axis 31 and can occupy two distinct positions. One of those positions is traced in continuous lines in FIG. 2, while the other position is partially represented in chain-dotted line in FIG. 2 under the reference numbers 21' and 22'. Furthermore, detectors 37 and 38 make it possible to determine whether products are located on the conveyor belts 21 or 22 of the recovery device or not by transmitting signals to an electronic control to drive and position the said belts accordingly. The second position of the detector 38 bears the reference number 38'. The detector 35 projects over the belt 1. Two contactors $b_1$ and $b_2$ serve to indicate the position of the belts 21 and 22. The same casing 32 also supports the part 6 of the storage device at its upper end. That part consists, essentially, of an endless conveyor belt 39 kept between tension wheels or cylinders 39a, 39b, 39c and 39d and driven by a drive wheel 40 connected, by a familiar means, with a drive motor 41. Two support wheels 42 and 43 make it possible to apply the conveyor belt 39 to the drive wheel 40 in a permanent manner. The conveyor belt 39 and the driving mechanism are installed on a support 44 which, itself, is fastened to the casing 32. At the end of the conveyor belt 39, a detector 45 is fastened whose role is identical with that of the detectors located at the ends of the carrier belts 21 and 22 of the recovery device.

Figure 3:
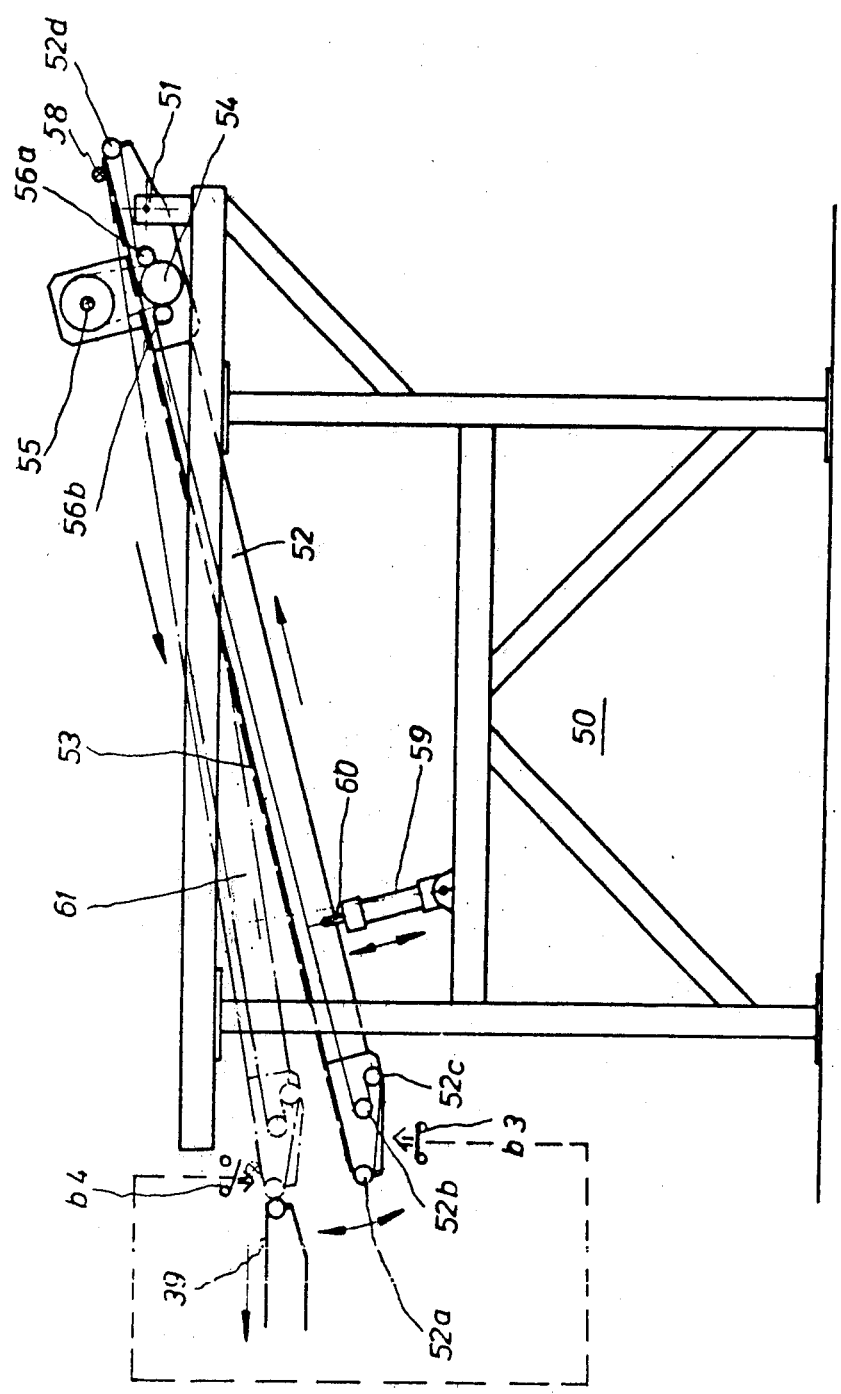
FIG. 3 is a detailed view showing a part of the storage device of the packing line of FIG. 1.

FIG. 3 presents, in greater detail, the part of the storage device bearing the reference number 7 in the description of FIG. 1. That part includes a casing 50 on which is installed, primarily, so that it can pivot around a horizontal axis of pivoting 51, the support 52 of an endless conveyor belt 53. That belt is driven by a driving wheel 54 activated by an independent driving motor 55, for example, by means of a strap or a chain. The conveyor belt 53 is supported by tension wheels or cylinders 52a, 52b, 52c and 52d, with that belt also being held against the drive wheel 54 by means of support wheels or cylinders 56a and 56b. A detector 58, (for example, a photoelectric cell) is located at the end of the conveyor belt 53. In the casing 50, a hydraulic or pneumatic jack is installed whose rod 60 forms a single piece with the support 52. In reality, the support 52 of the conveyor belt 53 can occupy two positions, one of which is traced in continuous lines on FIG. 3 and the other, bearing the reference number 61, is traced in chain-dotted lines on FIG. 3. In the position designated as the first one, the conveyor belt 53 is located in the prolongation of one or the other conveyor belt 21 or 22 designated in reference to FIG. 2. In its position 61, the conveyor belt 53 is in juxtaposition with the conveyor belt 39 described in reference to FIG. 2. Two contactors $b_3$ and $b_4$ serve to indicate the position of the support 52 on the casing 50.

Figure 4:
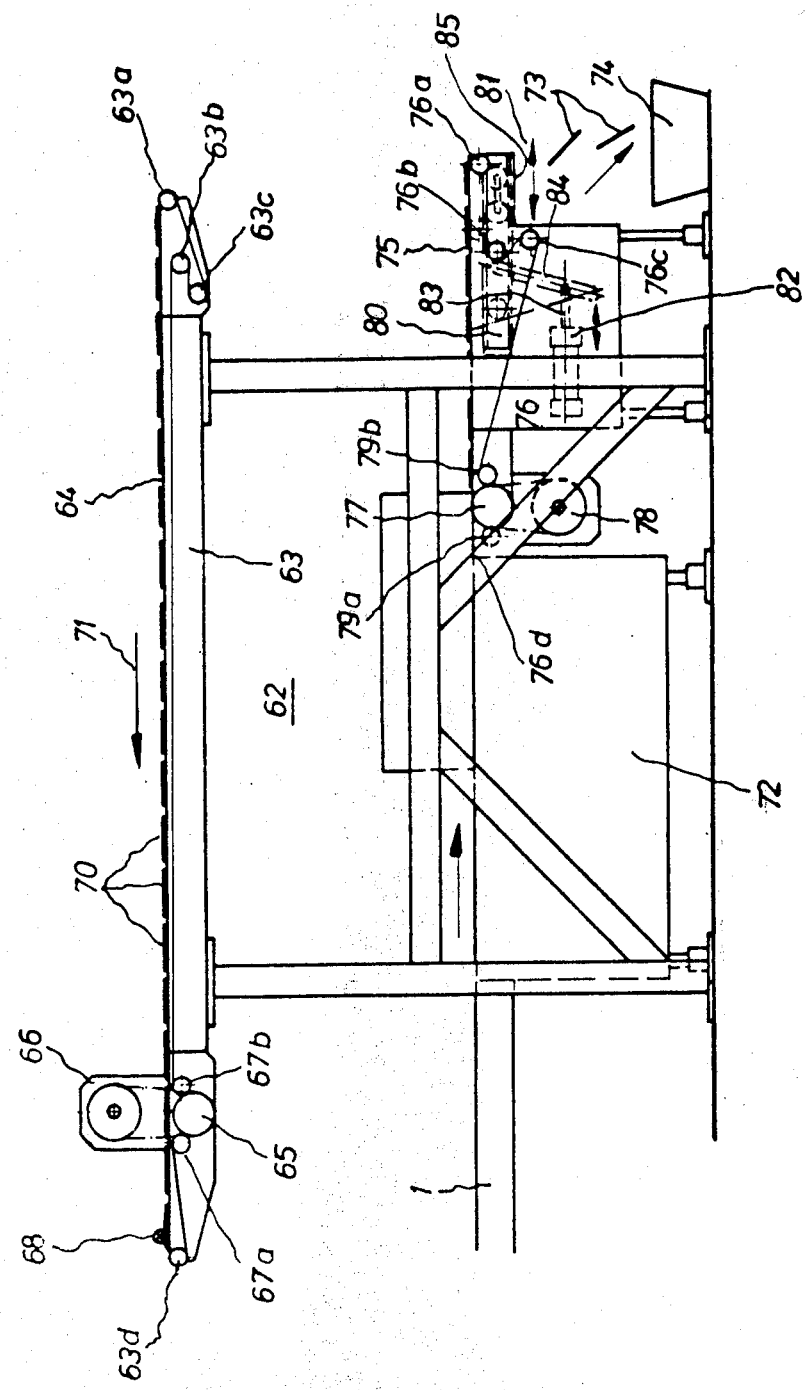
FIG. 4 is a detailed view showing another part of the storage device and the ejection device of the line of FIG. 1.

FIG. 4 illustrates a part of the storage device and the ejection device, which bear the reference numbers 8 and 4, respectively, in the description in reference to FIG. 1. The upper part of a casing 62 sustains a support 63, which bears an endless conveyor belt 64 and its driving mechanism. The belt 64 is held by the tension wheels or cylinders 63a, 63b, 63c and 63d. It is driven by a drive wheel 65 connected to an independent drive motor 66, by means of a chain or a strap, for example. In order to ensure permanent contact between the conveyor belt 64 and the drive wheel 65, two support wheels 67a and 67b are located on both sides of the drive wheel 65. A detector 68 located at the end of the conveyor belt 64 makes it possible to determine the presence of products such as slabs of chocolate 70 on the conveyor belt 64.

Naturally, several conveyor belts identical with the belt 64 can be located in the prolongation of one by the other in the direction of the arrow 71 in order to augment the storage capacity of the storage device. The products move on the conveyor belt 64 in the direction contrary to the movement of those products on the feeder conveyor belts bearing the reference number 1 in FIG. 1. The total length of the storage device, which is equal to the sum of the lengths of the various juxtaposed conveyor belts 64 depends upon where one wishes to return the stored products to the line.

Below the support 62, an automatic feeder station 72, represented schematically, is located. In fact, this is the last automatic feeder station in the line, for it is followed by the ejection device, whose role is to reject the products 73 into a recovery container 74 when the storage device is entirely saturated.

The ejection device consists of an endless conveyor belt 75 which is located in the prolongation of the feeder conveyor belts 1 at the exit from the automatic feeder station 72. The belt 75 is supported by tension wheels or cylinders 76a, 76b, 76c and 76d, installed on a support 76. It is driven by a drive wheel 77 which is actuated by an independent motor 78. The belt 75 is held against the drive wheel 77 by means of support wheels 79a and 79b. The tension wheels or cylinders 76a and 76b, in reality, are installed on a piece 80 which slides horizontally in the direction of the arrow 81 as a result of the action of a jack 82 whose rod 83 forms a single piece with a lever 84. The piece 80, which carries the tension wheels or cylinders 76a and 76b, can, for that reason, occupy either a first position represented by continuous lines or a second position represented by interrupted lines while keeping the conveyor belt 75 under tension. In the first position, the conveyor belt 75 constitutes a continuous path between the automatic feeder station 72, on the one hand, and the recovery device, on the other, which is in juxtaposition with it downstream on the line. In the second position, on the other hand, the downstream end of the conveyor belt 75 is withdrawn upstream (to the left in the drawing) and releases a trapdoor 85 through which the products being transported fall into the recovery basket 74.

Figure 5:
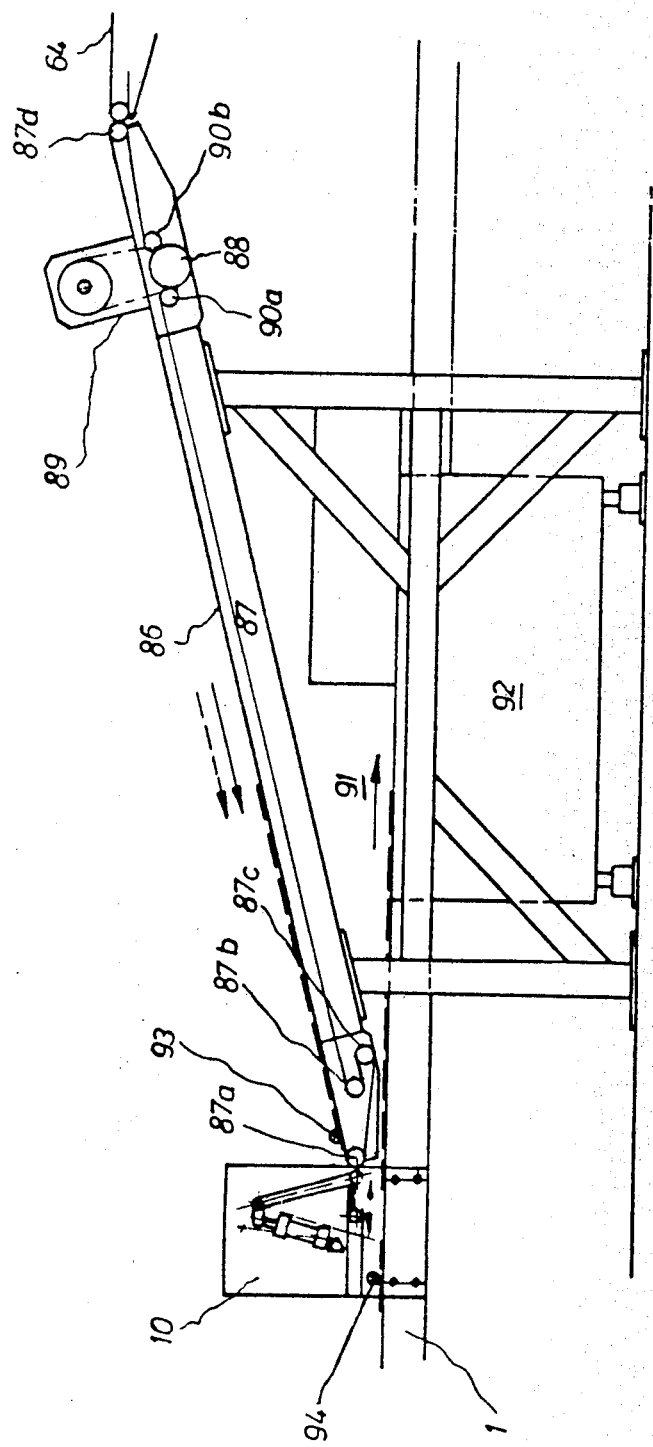
FIG. 5 represents the recycling device of the line of FIG. 1 in greater detail.

FIG. 5 shows the recycling device and its discharge device, which bear the reference numbers 9 and 10, respectively, in the description connected with FIG. 1, and whose role is to return the products stored temporarily in the storage device to the automatic packing line. The recycling device consists of an endless conveyor belt 86 borne by a support 87. That belt is supported by tension wheels or cylinders 87a, 87b, 87c and 87d mounted on the support 87. Furthermore, it is driven by a drive wheel 88, which itself is actuated by a driving motor 89. The conveyor belt 86 is kept in contact with the drive wheel 88 by means of two support wheels 90a and 90b. The support 87 is installed on an inclined plane on a casing 91 and designed to cause the products to pass from the conveyor belt 64 to one of the feeder conveyor belts 1 through the agency of the discharge device 10, upstream of the automatic feeder station 92, for example. Two detectors 93 and 94 are mounted at the ends of the conveyor belts 86 and 1 to determine, on the one hand, whether the belt 86 contains products coming from the storage device and, on the other hand, whether the belt 1 has a "hole" or vacant spot available to receive some recycled products.

Figure 6:
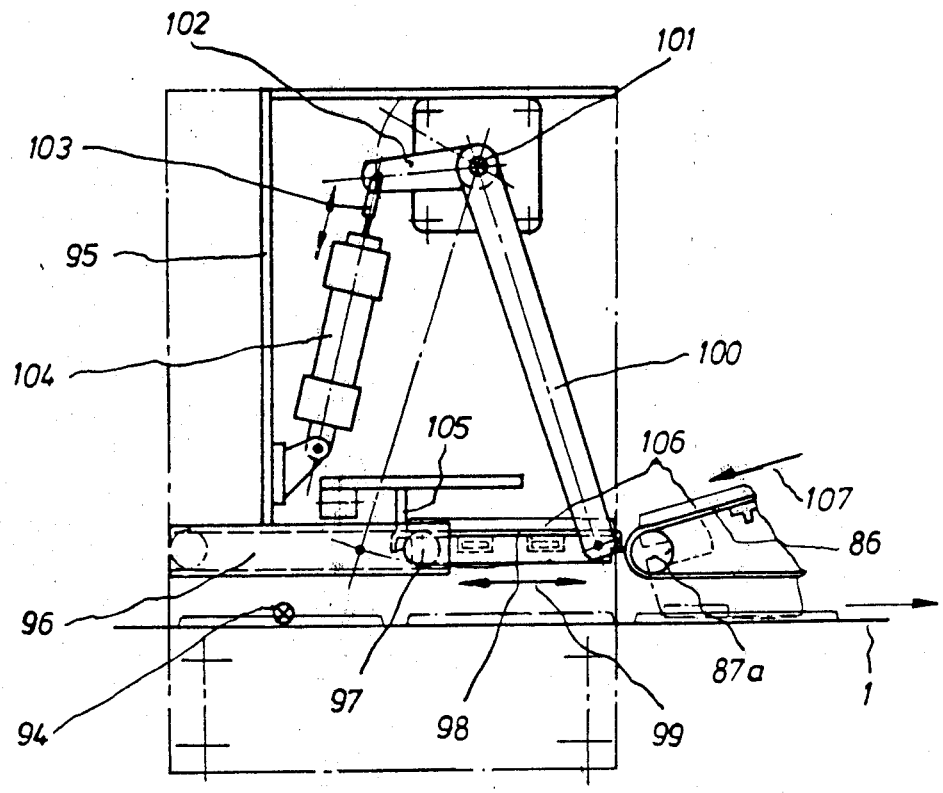
FIG. 6 is an enlarged view of the discharge device which constitutes a part of the recycling device shown in FIG. 5.

FIG. 6 is an enlarged view of the discharge device installed in the prolongation of the conveyor belt 86 of the recycling device. That device consists of a support 95 in the form of a cross piece forming a single piece with a guidance element 96 consisting, for example, of two lateral rails in which two rollers 97 engage which are installed on both sides of a platform 98 which can move horizontally in the direction of the arrow 99. The anterior end of the platform 98 is supported by a bent arm 100 borne upon an axis of rotation 101, and its other end forms a single piece with the rod 103 of the piston of a hydraulic or pneumatic jack 104 fastened onto the support 95. A stop 105 is installed at the posterior end of the platform 98.

The tablets of chocolate 106 coming from the conveyor belt 86 of the storage device and moving in the direction of the arrow 107 arrive on the platform 98 and are stopped at the end of their travel by the stop 105. At that moment, a detector (not shown) provides a signal to the control device of the jack 104, which acts upon the bent arm 100 and produces the movement of the platform 98 to the left in FIG. 6, with that platform being held, on the one hand, by the guidance element 96 by means of the rollers 97 engaged in the lateral rails, and, on the other hand, being supported by the lower end of the bent arm 100. The slabs of chocolate 106 are held by the stop 105 while the tablet 98 slides under them until they fall onto the feeder conveyor belt 1 located underneath, to be taken to an automatic feeder station which then directs them to a packing machine. Of course, this operation is only executed at the moment when a "hole" has been detected on the feeder conveyor belt 1 by means of the detector 94.

Figure 7:
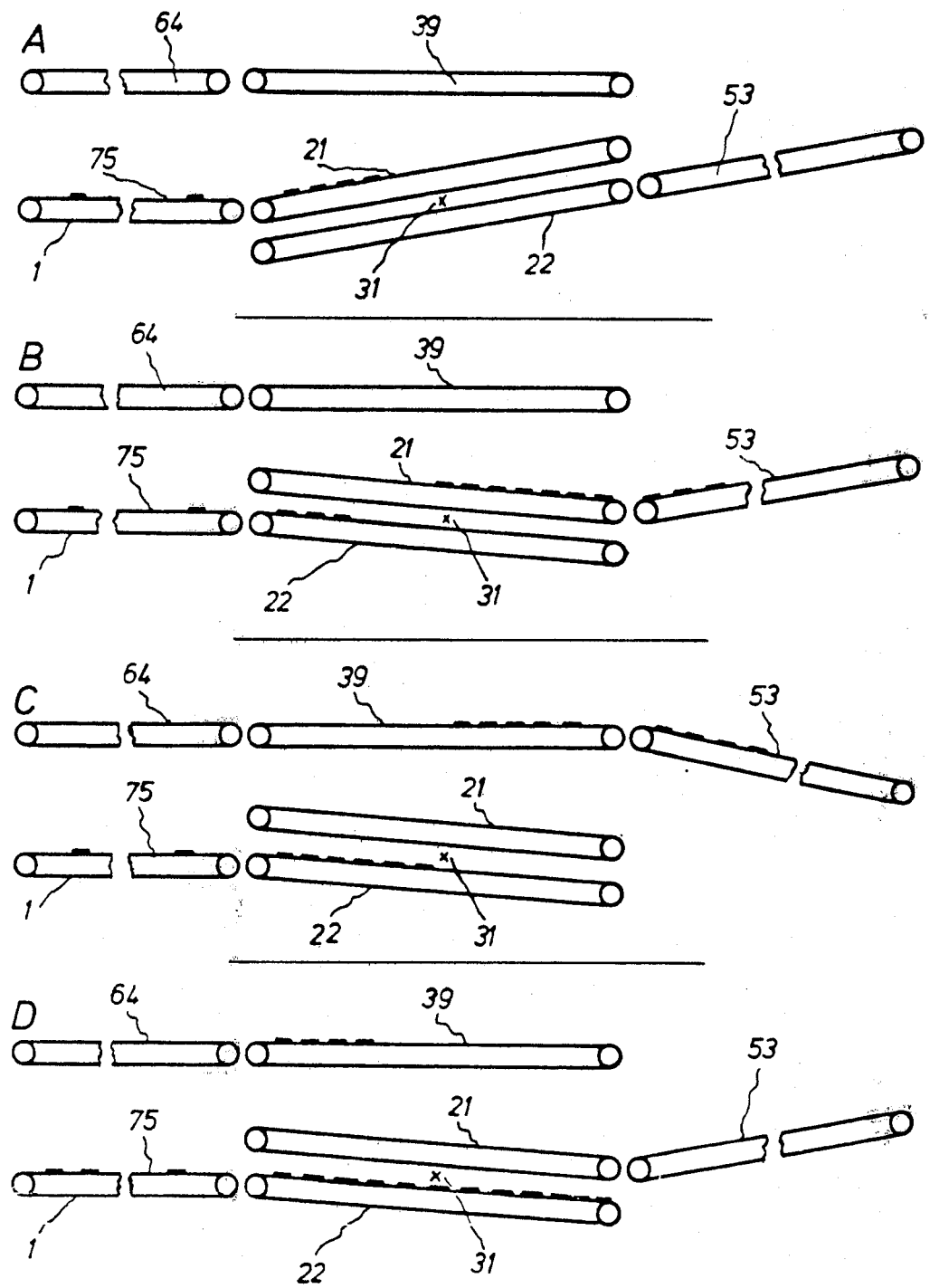
FIGS. 7A–7D are a sequence of diagrams showing the different stages in the functioning of the elements which make possible the recovery and automatic recycling of the products at the end of the line.

The functioning of the various elements of the automatic packing line, and particularly of the recovery, storage and recycling devices, will be described in connection with FIG. 7. When the products being transported on the feeder conveyor belts 1 pass the last automatic feeder station, they do so because, for one reason or another, it has not been possible for them to be taken charge of by the packing machines located along the line. They arrive on the conveyor belt 75 of the ejection device, which transports them to the recovery device as long as the storage device is not saturated. Let us take it that this is the case. Let us suppose, for example, that the conveyor belt 21 of the recovery device is positioned, in regard to the conveyor belt 75 of the ejection device, as is shown in FIG. 7A. The conveyor belt 75 takes the products which it is continuously receiving to the entrance to the conveyor 21. The latter is driven intermittently in such a way that the products are arranged regularly on the belt in spite of the fact that they are brought to its entrance in an irregular manner. The intermittent advance of the belt 21 is continued until it is full. At that time, the conveyor belt 22 of the recovery device is empty and the conveyor belt 53 of the storage device is also empty and is in its low position—that is, with respect to the said conveyor belt 22. At that time, the two parallel belts 21 and 22 pivot on their supports around the axis of horizontal rotation 31 in such a way that the belt 22 is brought opposite the conveyor belt 75 and the conveyor belt 21 is brought opposite the conveyor belt 53 of the storage device. The conveyor belt 75, if necessary, continues to bring the products which have not been taken charge of by the automatic feeder stations in an irregular manner, and those products are arranged in a regular manner on the conveyor belt 22, which is driven intermittently. This phase is illustrated by FIG. 7B. During this time, the conveyor belt 21 of the recovery device is driven continuously in such a way as to unload rapidly onto the conveyor belt 53 of the storage device. This latter operation should be carried out very rapidly so that the belt 21 will once again be available for a new series of products when the parallel conveyor belt 22 is full.

The ensuing phase is illustrated by FIG. 7C. When the products initially deposited on the belt 21 have all passed onto the conveyor belt 53, which, during this transfer operation, is driven continuously in the same direction and at the same speed as the conveyor belt 21, this belt pivots into its high position, where it is opposite the conveyor belt 39 of the storage device. Thus, the direction in which the conveyor belt 53 is driven is reversed, so that the products which are deposited on it are transferred continuously onto the conveyor belt 39. At the conclusion of that operation, the belt 53 is empty again and returns to its low position, that is, temporarily opposite the conveyor belt 21 of the recovery device.

This position is illustrated by FIG. 7D. It is maintained until the conveyor belt 22 of the recovery device is saturated again. At that time, the two conveyor belts 21 and 22 pivot on their supports around the pivoting axis 31, which brings us back to the configuration of FIG. 7A, where the conveyor belt 22, loaded with products this time, is opposite the conveyor belt 53 of the storage device, with the belt 21, emptied of its contents, being brought opposite the conveyor belt 75 for a new loading cycle.

The number of conveyor belts of the storage device can be more or less large, depending upon whether one wants to have a larger or smaller storage capacity. The products continuously deposited on the conveyor belt 39 are brought onto the belt 64 and the identical belts which are arranged after it.

As far as the functioning of the recycling device is concerned, one should refer to FIG. 5. The products coming from the conveyor belts 64 or those following the storage device are transferred continuously onto the conveyor belt 86 of the recycling device. When the latter is entirely full, the belt's driving mechanism is switched over to the intermittent mode of operation and the products are passed on to the discharge device, whose role is to deposit those products in "holes" on the feeder conveyor belts 1. The discharge device is preferably located between two automatic feeder stations, and the "holes" which are present on the feeder conveyor belts 1 are due to the picking up of products by the different feeder stations located upstream. When all the products initially deposited on the conveyor belt 86 have been recycled, that belt will again be driven continuously and will receive a new series of products stored temporarily on the conveyor belt 64 of the storage device.

Of course it can happen, as was stated previously, that the entire group consisting of the storage device and the conveyor belts of the recycling and recovery devices will be saturated. In that case, the only possible solution is to eject the products by means of the ejection device described in greater detail in connection with FIG. 4.

Figure 8:
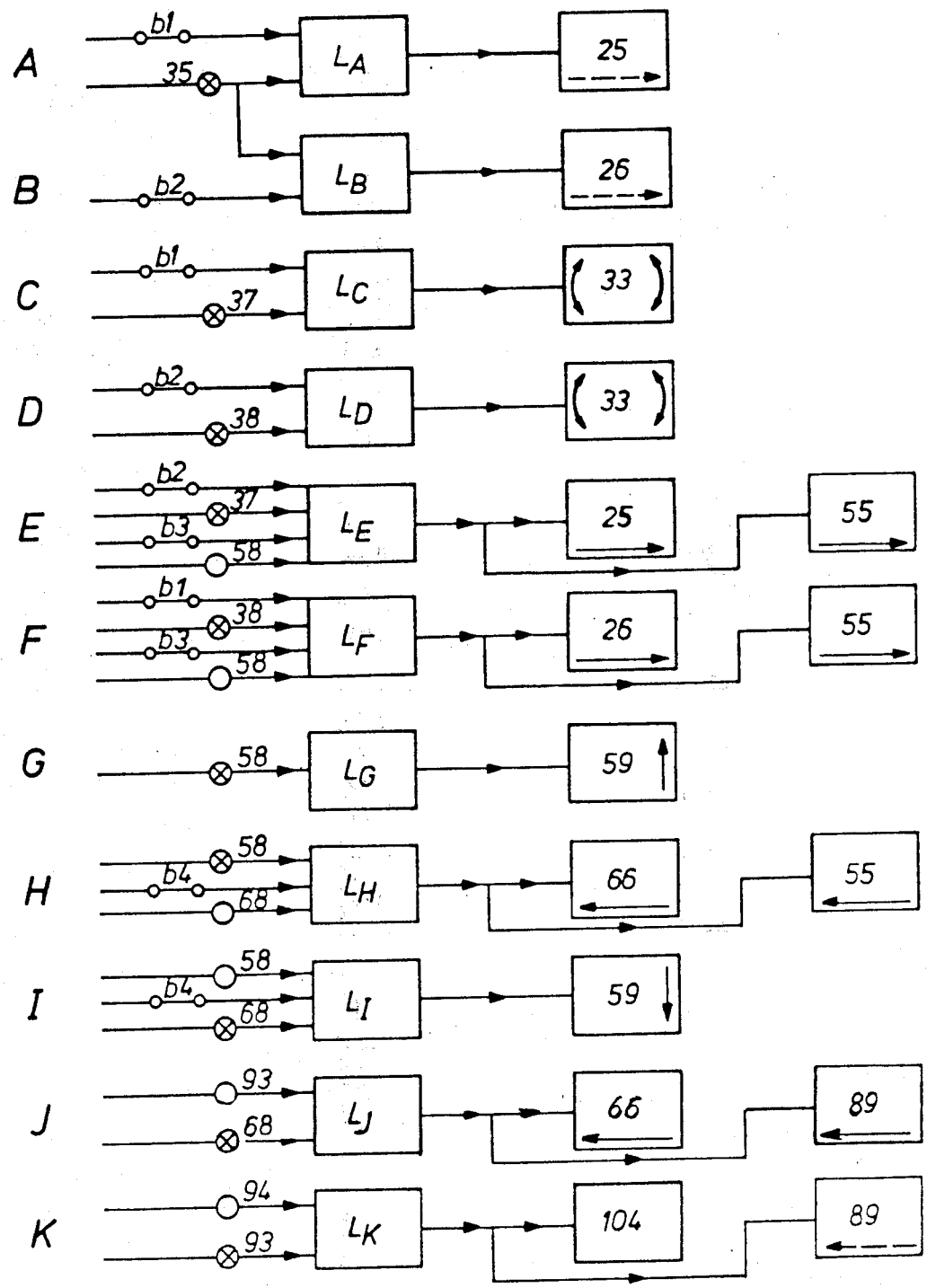
FIGS. 8A–8K are a series of schematic views of the electric connections between the various detection components and the controls of the mobile elements of the line.

With reference to FIG. 8A, $L_A$ represents a logic unit connected, at its output, with the drive motor 25 of the conveyor belt 21 and whose input is connected, on the one hand, with the contactor $b_1$ and with the photoelectric cell 35 on the other. When that cell detects products at the end of the belt 75 of the ejection device, and when, simultaneously, the contactor $b_1$ is closed, the logic unit $L_A$ gives the motor 25 the order to advance, step by step, in order to load the products on the belt 21.

The FIG. 8B illustrates a logic unit $L_B$ whose output is connected with the drive motor 26 of the conveyor belt 22 and whose input is connected with the contactor $b_2$ and the photoelectric cell 35. When that cell detects products, and when, simultaneously, the contactor $b_2$ is closed, the logic unit $L_B$ engages the motor 26 in conformity with an intermittent mode of operation in order to load the products onto the conveyor belt 22. It should be noted that the two interrupters $b_1$ and $b_2$ are complementary, that is, one of them is necessarily open when the other one is closed.

The FIG. 8C represents a logic unit $L_C$ connected, on the one hand, with the jack 33, or, more specifically, with the mechanism controlling that jack (not shown) and, on the other hand, with the contactor $b_1$ and the photoelectric cell 37. When the contactor $b_1$ is closed, that is, when the belt 21 is in the loading position, and the photoelectric cell 37 is obscured, that is, it is detecting products which, in reality, signifies that the belt 21 is entirely loaded, the jack 33 tips over the supports 23 and 24 of the belts to bring the belt 22 into the loading position and the belt 21 into the discharging position.

The FIG. 8D shows a logic unit $L_D$ connected, on the one hand, with the jack 33 and, on the other hand, with the contactor $b_2$ and the cell 38. When the contactor $b_2$ is closed and the cell 38 is detecting products at the end of the belt 22, the apparatus is in a position equivalent to the position described earlier. The jack tilts the belts 21 and 22 in such a way that the belt 22 is brought into the discharging position and the belt 21 into the loading position.

With reference to FIG. 8E, a logic unit $L_E$ is connected, by its input, to the contactors $b_2$ and $b_3$ and with the cells 37 and 58, while its output is connected with the independent drive motors 25 and 55. The photoelectric cell 37 is obscured, which is the equivalent of saying that the conveyor belt 21 is full. The photoelectric cell 58, when lighted, means that the belt 53 of the storage device is empty. Since the contactor $b_2$ is closed, the belt 21 is in the discharging position, and the fact that the contactor $b_3$ is closed means that the belt 53 is in the low position. This situation is illustrated by FIG. 7B. The motors 25 and 55 simultaneously drive the belts 21 and 53 continuously from the left to the right.

The same functioning is observed in the case of the FIG. 8F, where $L_F$ is a logic unit whose input is connected to the cells 38 and 58 and the contactors $b_1$ and $b_3$ and whose output is connected to the drive motors 26 and 55. The cell 38 is obscured, which is the equivalent of saying that the conveyor belt 22 is full. The cell 58, when lighted, signifies that the belt 53 of the storage device is empty. Since the contactor $b_1$ is closed, the belt 22 is in the discharging position and the fact that the contactor $b_3$ is closed signifies that 53 is in the low position. The logic unit $L_F$ gives the motors 26 and 55 the order to advance continuously to carry out the transfer of products from the belt 22 to the belt 53.

The FIG. 8G represents a logic unit $L_G$ whose input is connected with the photoelectric cell 58 and whose output is connected with the jack 59, or, more exactly, with its control device (not shown). When the photoelectric cell 58 is obscured, that is the equivalent of saying that the conveyor belt 53 is full. The corresponding signal generates a command to the jack 59, which causes the support 52 of the conveyor belt 53 to tilt upward.

The FIG. 8H represents a logic unit $L_H$, whose input is connected with the photoelectric cells 58 and 68 and with the contactor $b_4$ and whose output is connected with the motors 66 and 55. The photoelectric cell 58 is obscured, which is interpreted by the logic unit $L_H$ as an indication that the conveyor belt 53 is full. The cell 68, placed at the end of the conveyor belt 64, is lighted, which signifies that the said belt is empty and consequently that it is ready to receive the products temporarily stored on the belt 53. Furthermore, the contactor $b_4$ is closed; the corresponding signal signifies that the support 52 of the belt 53 is raised, with that belt thus being in alignment with the belt 64. When these conditions are satisfied, the logic unit $L_H$ gives the motors 55 and 66 the order to advance continuously from the right to the left in order to carry out the transfer of the products from the belt 53 onto the belt 64.

With reference to FIG. 8I, a logic unit $L_I$ has its input connected with the cells 58 and 68 and the contactor $b_4$ and its output with the jack 59. The photoelectric cell 58 is lighted, which signifies that the belt 53 is empty. The photoelectric cell 68 is obscured, which signifies that the belt 64 is full. The contactor b₄ is closed, which signifies that the support 53 is in the high position. To return that support to the low position and make it ready for a new cycle, the logic unit L_I gives the jack 59 the order to lower the support 52.

The FIG. 8J illustrates a logic unit L_J, whose input is connected with the photoelectric cells 93 and 68 and whose output is connected with the motors 66 and 89. The cell 93 is lighted, which signifies that the conveyor belt 86 of the recycling device is empty. The photoelectric cell 68 is obscured, which signifies that the conveyor belt 64 of the storage device is full. At that time, the logic unit L_J gives the order to the motors 66 and 89 to execute a movement from the right to the left of the belts which they drive continuously.

With reference to FIG. 8K, a logic unit L_K has its input connected with the cells 93 and 94 and its output, on the one hand, with the jack 104 of the discharge device and, on the other hand, with the drive motor 89. The photoelectric cell 94 placed upstream from the discharge device above the conveyor belts 1 is lighted, which signifies that there is a "hole" on the conveyor belt 1. The cell 93, obscured, signifies that products are available on the belt 86 of the recycling device and waiting to be discharged onto the conveyor belt 1. The logic unit L_K gives the jack 104 the order to activate the discharge device and the drive motor 89 of the conveyor belt 86 the order to execute an intermittent movement from the right to the left.

It is quite evident that the devices described above only represent one embodiment, which can be subjected to numerous variations. For example, the support 52 of the conveyor belt 53, instead of being tilted into the high position and the low position, could be installed on a vertical pivot and turned through an angle of 180° to carry out the transferring of products from the belt 53 onto the belt 39. In that case, it would no longer be necessary to reverse the direction of rotation of the driving device of the conveyor belt 53. Furthermore, the photoelectric cells could be replaced by detectors of a different type, e.g. by simple contactors or electronic counters which count the number of products taken onto the conveyor belt and provide a signal to the various logic units when a predetermined number is reached.

Whatever solutions are adopted, the purpose of the invention is to produce, by relatively simple means, an entirely automatic packing line.

It should now be apparent that the automatic packing line as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. For an automatic packing line which includes a feeder conveyor means arranged to bring a succession of articles which are to be packed, past a series of packing stations each served by a respective automatic feeder station, each of which is for removing at least some of the passing articles for packing at the respective packing station, so that downstream from the last of said automatic feeder stations in said series, the feeder conveyor means bears only such remaining ones of said articles as have not been removed by any of said automatic feeder stations; a recovery device located downstream from said last automatic feeder station for collecting said remaining articles; a storage device for temporarily storing said remaining articles collected by said recovery device; and an ejection device for evacuating said remaining articles from the feeder conveyor means should the recovery device become saturated with said remaining articles, the improvement wherein:

said automatic packing line further includes an automatic recycling device for recycling to said feeder conveyor means, upstream of at least said last automatic feeder station but downstream of the furthest upstream one of said automatic feeder stations, said remaining articles temporarily stored by said storage device into vacant locations on said feeder conveyor means created by operation of said automatic feeder stations; there being a sufficient number of said automatic feeder stations normally to avoid saturation of the recovery device;

each of said recovery device, said storage device and said automatic recycling device including at least one endless belt for conveying said remaining articles thereon, and means for arranging in succession at least one said endless belt of each said device; means for independently driving the endless belts of each said device when in said succession; and at least one article presence or absence-responsive sensor associated with each such driving means for controlling operation of each respective driving means;

the at least one endless belt of said recovery device comprising two endless belts mounted one above the other on a frame;

means movably mounting said frame between a first position wherein the upper one of said two endless belts is in succession with said ejection device and a said at least one endless belt of said temporary storage device is in succession with the lower one of said two endless belts and a second position wherein the lower one of said two endless belts is in succession with said ejection device and said one endless belt of said temporary storage device is in succession with the upper one of said two endless belts; and said means for independently driving said two endless belts comprises means operable when said frame is in said first position for driving said upper belt intermittently forwards and for driving said lower belt continuously forwards and operable when said frame is in said second position for driving said upper belt continuously forwards and for driving said lower belt intermittently forwards, so that the one of said two endless belts which succeeds the ejection device may intermittently advance at a proper rate for accepting articles from the ejection device and the one of said two belts which is succeeded by said one endless belt of the temporary storage device may quickly unload articles onto said one endless belt of the temporary storage device.

2. The automatic packing line improvement of claim 1, wherein:

the at least one endless belt of the temporary storage device in addition to said one endless belt thereof further includes a second endless belt; and the temporary storage device further includes a frame means for said one endless belt thereof, this frame means being movable between a first position wherein a run of said one endless belt of said temporary storage device is in succession with either one of the said upper and lower endless belts of said recovery device and a second position wherein said second endless belt of said temporary storage device is in succession with said run of said one endless belt of said temporary storage device.

3. The automatic packing line improvement of claim 2, wherein:

said means for independently driving said one endless belt of said temporary storage device is reversely operable for advancing said run of said one endless belt of said temporary storage device when said run is in succession with either one of said upper and lower endless belts of said recovery device, and for regressing said run of said endless belt of said temporary storage device when said run is in succession with said second endless belt of said temporary storage device;

said second endless belt of said temporary storage device being disposed throughout at least part of the length thereof in coextending, vertically spaced relation with said recovery device.

4. The automatic packing line improvement of claim 1, wherein:

said automatic recycling device further includes a discharge mechanism interposed between the said at least one endless belt of said automatic recycling device and said feeder conveyor means upstream of at least the last of said automatic feeder stations, for repositioning said remaining articles once again upon said feeder conveyor means.

5. The automatic packing line improvement of claim 4, wherein:

said discharge mechanism includes mobile platform means for forming longitudinally successive transversely extending groups of said remaining articles as said discharge mechanism repositions said remaining articles once again upon said feeder conveyor means.

6. For an automatic article conveying line which includes a feeder conveyor means upon which a succession of articles is conveyed through a series of automatic article unloading stations, wherein at least some of the articles are to be unloaded in at least one of said automatic article unloading stations, but wherein there is some possibility that at least some of the articles, at least some of the time, will remain under conveyance upon the feeder conveyor means downstream of the last automatic article unloading station in said series, an automatic recycling means for collecting such remaining articles and for recycling them back to said feeder conveyor means at a point on said feeder conveyor means that is upstream of at least said last automatic article unloading station, said automatic recycling means including:

first and second recovery device conveyor belt means alternatively positionable to receive from said feeder conveyor means said remaining articles downstream of said last automatic article unloading station;

a reversely running temporary storage conveyor belt means alternatively positionable to, while running downstream, received said remaining articles from the one of said first and second recovery device conveyor belt means which is not then positioned to receive remaining articles from said feeder conveyor means and, while running upstream discharge said remaining articles received thereon onto a temporary storage conveyor belt means; and a discharge mechanism interposed between said temporary storage conveyor belt means and said feeder conveyor means upstream of at least the last of said automatic article unloading stations, for repositioning said remaining articles received from said conveyor belt means once again upon said feeder conveyor means into vacant locations on said feeder conveyor means created by operation of said automatic article unloading stations; there being a sufficient number of said article unloading stations normally to automatically unload all of the articles from the feeder conveyor means under steady state conditions;

means sensitive to said first recovery device conveyor belt means becoming saturated with said remaining articles for repositioning said first and second recovery device conveyor belt means relative to said feeder conveyor means to thereby cause said second recovery device conveyor belt means to be positioned instead of said first recovery device conveyor belt means to next receive said remaining articles from said feeder conveyor means, and sensitive to said second recovery device conveyor belt means becoming saturated with said remaining articles for repositioning said first and second recovery device conveyor belt means relative to said feeder conveyor means to thereby cause said first recovery device conveyor belt means to be positioned instead of said second recovery device conveyor belt means to next receive said remaining articles from said feeder conveyor means;

means for intermittently advancing the one of said first and second conveyor belt means which is positioned to receive said remaining articles from said feeder conveyor means in response to the rate at which remaining articles are needing to be so received, in order to tend to maximize the capacity of that conveyor belt means for said remaining articles, and for continuously advancing the one of said first and second conveyor belts which is positioned to discharge said remaining articles received thereon onto said reversely running temporary storage conveyor belt means, in order to tend to quickly unload the latter one of said first and second conveyor belts.

7. For an automatic packing line in which a stream of articles is being conveyed downstream upon a feeder conveyor belt through a series of automatic feeder stations, wherein, in normal operation, some but less than all of the articles are abstracted from the feeder conveyor belt at each automatic feeder station, a method for recycling to the feeder conveyor belt upstream of at least the last automatic feeder station in said series at least a substantial proportion of the articles which may remain on the feeder conveyor belt after the feeder conveyor belt has passed the last automatic feeder station in said series, said method comprising:

automatically sensing the arrival of said remaining articles downstream of said last automatic feeder station, and intermittently operating a first recovery device endless conveyor belt in succession to said feeder conveyor belt in response to said sensing, in order to accumulate in condensed fashion a load of such remaining articles on said first recovery device endless conveyor belt;

automatically sensing when said load has been fully accumulated and in response to said sensing shifting said first recovery device endless conveyor belt out of succession with said feeder conveyor belt and, in place thereof, intermittently operating a second recovery device endless conveyor belt in succession to said feeder conveyor belt in response to said sensing of the arrival of said remaining articles downstream of said last automatic feeder station, in order to accumulate in condensed fashion a load of such remaining articles on said second recovery device endless conveyor belt;

automatically sensing when said load has been fully accumulated on said second recovery device endless conveyor belt and in response to said sensing shifting said second recovery device endless conveyor belt out of succession with said feeder conveyor belt and said first recovery device endless conveyor belt again into succession with said feeder conveyor belt;

when either said first or said second recovery device endless conveyor belt is sensed to have fully accumulated said load thereon, automatically juxtaposing a temporary storage device endless conveyor belt in succession with that so-loaded recovery device endless conveyor belt and automatically continuously operating both said so-loaded recovery device endless conveyor belt and said temporary storage endless conveyor belt while automatically sensing for completion of unloading of said load from said so-loaded recovery device endless conveyor belt onto said temporary storage endless conveyor belt, then automatically terminating said continuous operation of that recovery device endless conveyor belt upon automatically sensing said completion;

automatically transferring the load of articles which have been unloaded onto said temporary storage endless conveyor belt onto an endless conveyor belt running back upstream relative to at least part of said feeder conveyor belt;

automatically sensing for gaps in said stream of articles on said feeder conveyor belt at a site that is upstream of at least the last automatic feeder station in said series, and automatically transferring at least ones of said articles from said upstream-running endless conveyor belt onto said feeder conveyor belt into ones of said gaps in response to said sensing of said gaps.

* * * * *